May 17, 1966  A. PITNER  3,251,118
METHOD OF PRODUCING A SEGMENTED CAGE FOR ROLLER OR
NEEDLE BEARINGS
Original Filed June 4, 1962  2 Sheets-Sheet 1

May 17, 1966  A. PITNER  3,251,118
METHOD OF PRODUCING A SEGMENTED CAGE FOR ROLLER OR
NEEDLE BEARINGS
Original Filed June 4, 1962  2 Sheets-Sheet 2

United States Patent Office 3,251,118
Patented May 17, 1966

3,251,118
METHOD OF PRODUCING A SEGMENTED CAGE FOR ROLLER OR NEEDLE BEARINGS
Alfred Pitner, Paris, France, assignor of one-half to Nadella S.A., Rueil-Malmaison, France, a French body corporate
Original application June 4, 1962, Ser. No. 199,866. Divided and this application May 25, 1965, Ser. No. 458,582
Claims priority, application France, July 31, 1961, 869,542
5 Claims. (Cl. 29—148.4)

This is a divisional application of my application, Serial No. 199,866, filed June 4, 1962. Now Patent No. 3,199,-935, granted August 10, 1965.

The present invention relates to a method of producing cages in segments for roller or needle bearings, for example for mounting such cages on flanged support faces or in housings having such shape that it would be difficult or impossible to mount a cage in one piece.

It has already been proposed to provide roller or needle bearing cages in one piece with retaining means retaining the rollers or needles in the inward direction formed for example on the bars separating the apertures receiving the rollers or needles but these retaining means have been constructed in such manner that they serve to prevent the loss of the rollers or needles only during handling and no contact occurs in service between these means and the rollers or needles; this has been achieved by giving to the rolling elements such dimensions and play that, in the event of the cage becoming off center, certain parts of the cage but against the outer race or extensions thereof before the inward retaining means come in contact with the rollers or needles. This is a rational solution when the cage is in one piece, but not so when such a cage is in segments since the latter tend to separate under the effect of centrifugal force and rub heavily against the outer race or the extensions thereof. This results in wear, overheating, noises and even a danger of destruction of the cage.

It has been discovered that this drawback can be avoided in utilizing the rollers or needles as support points to prevent the segments of the cage from coming in contact with the outer race under the effect of centrifugal force by means of elements which also act during handling as retaining means retaining the needles in the inward direction, and that the disadvantage of this support when the bearing is in service can be eliminated or greatly diminished by reducing the mass of the cage subjected to centrifugal force $m\omega^2R$, or by reducing the pressure of contact by an extension of the surface or contact or by employing these two types of means when the angular speed $\omega$ or the mean Radius R of the cage are great enough to necessitate such precautions.

The object of the invention is therefore to provide a method of producing a massive segmented cage for a cylindrical roller or needle bearing and comprising apertures separated by bars whose ends are interconnected by circumferential end rims, the flanks of said bars extending inwardly from the geometric pitch cylinder defined by the axes of the rollers or needles and converging in such manner as to offer a minimum circumferential distance therebetween which is less than the diameter of the rollers of needles, said cage being so arranged that the bars and rims of each segment constitute a single piece formed by sheet material which is cut out and bent, the flanks of the bars having a plane part extending at least in the region of said pitch cylinder, and the distance between the convergence of said flanks and the diameter of the rollers and needles being such that the latter always project from the outer cylindrical surface of each cage segment when they abut the inner parts of said flanks.

The reduction in the mass of the segments subjected to centrifugal force can be achieved by the choice of the density of the material of which they are composed.

The increase in the surface of contact of the rollers of needles with the retaining means retaining them in the inward direction can be achieved by providing a linear contact rather than a point contact which extends along the entire length, or a large part of the length, of the generatrices of the rollers of needles.

Further features and advantages of the invention will be apparent from the ensuing description, with reference to the accompanying drawings to which the invention is in no way limited. In the drawings.

Figure 1:
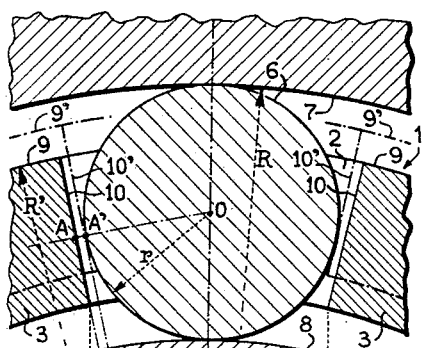
FIG. 1 is a partial cross-sectional view of one embodiment of the invention.
Figure 4:
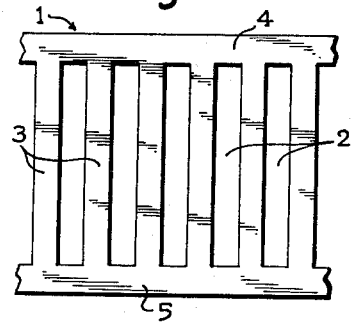
FIG. 4 is a perspective view of the segmented cage.
Figure 3:
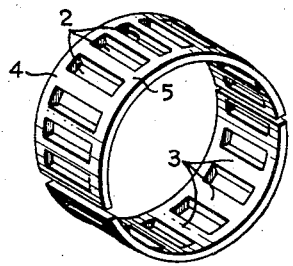
FIG. 3 is a perspective view of a blank used in one manner of producing the aforementioned cage segments.

With reference to FIG. 1, the reference character 1 designates a cage segment provided with apertures 2 separated by bars 3 which are interconnected by end strips or rims 4 and 5 (FIG. 3 and 4). A rolling element in the form of a roller or needle 6 is located in each aperture.

In the embodiment shown in FIG. 3, the complete cage has two segments but it could be divided into a larger number of segments. After mounting, the ring of rollers or needles is interposed between an outer race 7 of an outer bearing member and an inner race 8 of an inner bearing member.

According to the invention, the flanks of the apertures are so shaped and dimensioned relative to the diameter of the needles, that the radial displacement of the segments under the effect of centrifugal force is limited by the bearing of the cage segment against the rollers or needles before the outer surface 9 of the segment comes in contact with the outer race 7 or extensions thereon.

In the embodiment shown in FIG. 1, the flanks 10 of the apertures are rectilinear but convergent toward the axis C in the neighborhood of the axis of the bearing, so that the inner width $d$ of the aperture is smaller than the diameter $2r$ of the roller or needle. Under these conditions, when the cage segment 1 is urged outwardly by centrifugal force its convergent flanks assume the position 10' tangentially of the roller or needle 6 and the outer surface 9 of the segment assumes the position 9' and is held a suitable distance away from the race 7. To this end, the clearance 2AA' between the flanks of the aperture and the tangents to the rolling elements 6, which are parallel with these flanks in the mean position of the cage segment, must be less than a certain value which is easily calculated. In this calculation it is assumed, although this is only an approximation, that the point C coincides with the axis of the bearing. In extending the flanks of said tangents up to a radius intersecting the centre C and the centre O of the rolling element, these extensions intersect said radius at BB'. If $a$ is the angle of inclination or the semi-angle of convergence of the flanks it is clear that the semi-clearance $AA'=BB'=B'C \sin a$. B'C represents the maximum radial displacement of the cage segment, which must be less than the difference $R-R'$, R being the radius of curvature of the race 7 and R' the radius of curvature of the outer surface 9 of the cage segment. If $i$ represents the clearance 2AA' is is clear that the relation $$j < 2(R-R') \sin a$$

must be satisfied.

Figure 2:
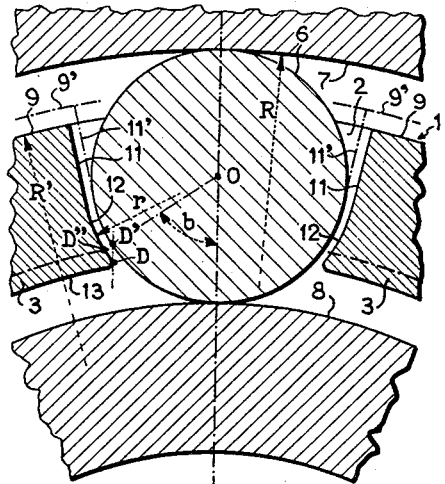
FIG. 2 is a view similar to FIG. 1 of a modification of the invention.

In the embodiment shown in FIG. 2, the flanks 10 of the apertures 11, which could comprise rectilinear parts, converge approximately toward the axis of the bearing, have a curved surface 12, 12 having a radius of curvature $r$ in the neighborhood of the radius of curvature of the rolling element, and form with the inner surface 13 of the segment a nose or shoulder D which is preferably slightly rounded. When the segment is urged outwardly by centrifugal force its noses D or its curved flanks 12 bear against the rolling element 6, the apertures assuming the position 11' and the outer surface 9 of the segment the position 9' at a suitable distance from the race 7. For this purpose, it is necessary that the clearance 2D' D" between the periphery of the rollers or needles and the points of the noses D nearest to this periphery be less than a certain value which is also easily calculated. At the moment of contact, the nose D occupies the position D' and DD' represents the maximum radial displacement $e$ of the segment. If $b$ is the angle made $b$ the radius OD' with the radius OC intersecting the axis of the bearing, it is easy to calculate that the semi-clearance $D'D''=e \cos b$ (neglecting the very slight difference in the angle $b$ for the points D and D') and that $$e = \frac{D'D''}{\cos b} = \frac{j}{2 \cos b}$$

must be less than $R-R'$, whence the relation:

$$j < 2(R-R') \cos b$$

Depending on the values of the radii R and R' and the values of the angles $a$ and $b$, a choice is made between the solution shown in FIG. 1 and that shown in FIG. 2, bearing in mind the manufacturing tolerances determining the smallest possible clearance $j$ and the risk of the rolling elements wedging (for example if the angle $a$ is too small).

It will be observed that the convergence of the flanks shown in FIG. 1 or noses such as D shown in FIG. 2, also serve to retain the rollers or needles in the inward direction, for example during the handling of the cage independently of the races.

It will be observed that, in service, contact occurs at A (FIG. 1) or the D' (FIG. 2) between the flanks of the apertures and the rolling elements. In single-piece cages this contact is arranged if possible on the pitch circle of the rolling elements. In a segmented cage, in order to avoid deterioration of the segments against the race 7, this provided contact must be arranged outside this pitch circle, but the resulting disadvantages are eliminated or rendered practically harmless by reducing the mass of the segments in selecting a material of but little density (for example a plastic) or by reducing the thickness of the segment, which need not exceed the semi-diameter $2r$ of the rolling elements and this might require providing no retaining means for retaining the rolling elements in the outward direction.

Further, it is well to reduce the pressure of contact at the point A or D' by an extension of the surface of contact. A linear contact over the entire length of the generatrices of the rolling elements intersecting A or D', or in any case over a large part of said length (rather than a point contact at one of several points), usually provides a solution to this difficulty but it is also possible to obtain a surface contact by giving the surface 12 the same radius as the rolling element, either by a precise calibration or by the running-in achieved automatically in service.

The small thickness of the cage makes available a large space for an abundant reserve of lubricant.

To preclude scratching of the rolling elements by the noses such as D in the embodiment shown in FIG. 2, these noses are slightly radiused or rounded, as already mentioned.

A cage segment such as that described can be produced by various methods, but it is convenient to obtain it by blanking out from strip material and bending.

As shown in FIG. 4, the starting material or stock can be in the form of a flat strip or band in which the apertures 2 are pierced. The bending of this blank automatically provides the convergence of the flanks, as shown in FIG. 1.

Figure 5:
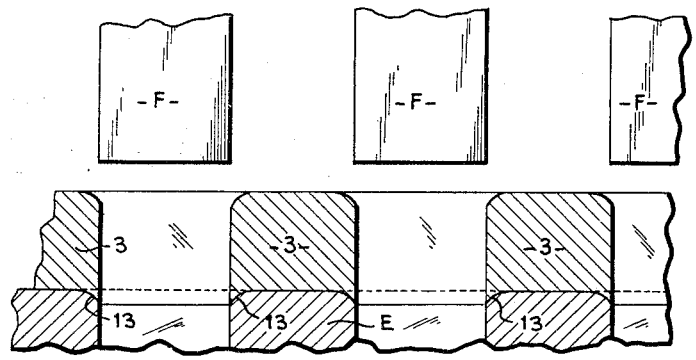
FIGS. 5 and 6 illustrate one particular manner of producing the flanks of the apertures by punching so as to obtain the sectional shape shown in FIG. 2.
Figure 6:
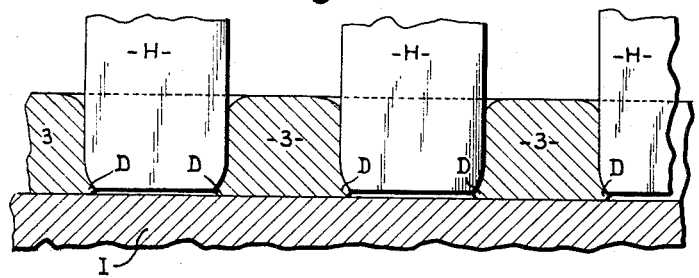

To shape the flanks provided with noses or bearing shoulders as shown in FIG. 2, a stamping or swaging operation could be used. FIGS. 5 and 6 show an example of such an operation.

The blank shown in FIG. 4 is punched on a die E (FIG. 5) by means of punches F. The solid parts of the die are provided with rounded corners 13 so that the punches form in the blank lips 16 which slightly project therefrom. In a second stage, the blank is placed on a flat anvil I and punches H having rounded edges straighten the lips against the anvil so as to form the noses D, the small radius being obtained in providing a suitable shape to the edges of the punch.

Figure 7:
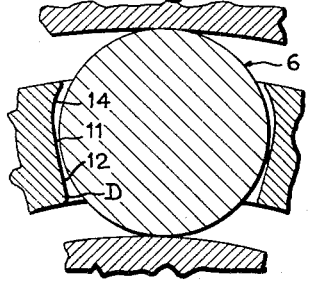
FIG. 7 is a view similar to FIG. 2, on a reduced scale, of a modification of the cage shown in FIG. 2 and including outer retaining means for the needles.

If the apertures of the segments are desired to be provided with retaining means retaining the rolling elements 6 in the outward direction, the flank shape shown in FIG. 7 could be adopted, these flanks comprising on the outer side of the cage segment projections or noses 14 which reduce the width of the aperture to a value less than the diameter of the element 6. These noses 14 can be connected to rectilinear convergent flanks 11, and if desired, the latter could include curved parts 12 with noses D.

To form the noses 14 a punching and forming operation as illustrated in FIGS. 5 and 6 is performed but the blank is bent in a direction opposite to that previously described. Thus, as the noses 14 are located in FIG. 5 in the same position as the noses D, the blank is bent in such manner that the noses 14 are located on the convex surface of the segment.

Figure 8:
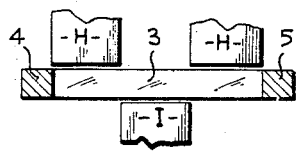
FIG. 8 is a partial longitudinal section view of a cage segment blank showing how the flanks of the apertures can be formed in accordance with the embodiment shown in FIG. 7.
Figure 9:
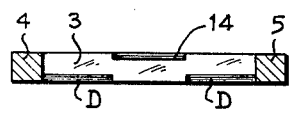
FIG. 9 is a view similar to FIG. 8 after the flanks have been formed.

If it is desired to provide both the noses 14 and the noses D, it is possible to proceed as illustrated in FIGS. 8 and 9, where H represents the forming punches producing the noses D (FIG. 9) and I represents a forming punch producing the noses 14, the noses D and 14 being of course in staggered relation along the length of the aperture so as to permit operation of these punches.

In the course of production of the segment, lubricant passages could be formed in certain regions and in particular toward the middle of the bars 3, since it is above all toward the parts located near the ends of the rolling elements that the retaining action of the segment is most effective. Indeed, in actual operation the contact between the rolling elements and the faces of the bars is more frequent and intimate at these parts and this insures the guiding of the rolling elements.

Limitation of an out-of-centre condition of the cage segments must be achieved as mentioned hereinbefore by the bearing of a portion of each segment located substantially on the same generatrix, so as to easily afford a precise and cheap construction of each bar and insure the contact between this generatrix and a portion of the bar constituted by a plane or curved surface coinciding with the plane tangent to the considered generatrix or but little removed from this plane.

The invention applies essentially to cage segments for rolling elements constituted by needles or rollers having a small diameter relative to their length, but it could be employed for other forms of rolling elements, for example elements having a slightly convex generatrix.

It must be understood that the cage elements according to the invention could be so constructed as to receive a plurality of rows of rolling elements.

Although specific embodiments of the invention have been described, many modifications and changes may be made therein without departing from the scope of the invention as defined in the appended claims.

In the course of production of the segment, lubricant passages could be formed in certain regions and in particular toward the middle of the bars 3, since it is above all toward the parts located near the ends of the rolling elements that the retaining action of the segment is most effective. Indeed, in actual operation the contact between the rolling elements and the faces of the bars is more frequent and intimate at these parts and this insures the guiding of the rolling elements.

Limitation of an out-of-center condition of the cage segments must be achieved as mentioned hereinbefore by the bearing of a portion of each segment located substantially on the same generatrix, so as to easily afford a precise and cheap construction of each bar and insure the contact between this generatrix and a portion of the bar constituted by a plane or curved surface coinciding with the plane tangent to the considered generatrix or but little removed from this plane.

The invention applies essentially to cage segments for rolling elements constituted by needles or rollers having a small diameter relative to their length, but it could be employed for other forms of rolling elements, for example elements having a slightly convex generatrix.

It must be understood that the cage elements according to the invention could be so constructed as to receive a plurality of rows of rolling elements.

Although specific examples of the method according to the invention have been described, many modifications and changes may be made therein without departing from the scope of the invention as defined in the appended claims.

What I claim and desire to secure by Letters Patent is:

1. Method of producing a part-cylindrical segment of a cage for the rolling elements of a bearing, consisting of the steps of taking a strip of material having a length which is such that the subsequently produced part-cylindrical segment subtends an angle of no more than 180° at the center of curvature of the segment, piercing a row of spaced apertures in the strip of material so as to form between the apertures bars having a rectangular cross-sectional shape in a plane containing said row of apertures, said row extending longitudinally of the strip and the bars extending transversely of the strip and bending the strip so that it assumes the shape of a portion of a cylinder having an axis parallel to said bars, whereby the adjacent flanks of bars defining the same aperture taper inwardly of said cylinder, the width between adjacent flanks defining the same aperture, measured longitudinally of said strip on the concave side of the strip, being less than the width of the rolling elements to such extent that when the rolling elements radially abut said flanks they protrude from the outer convex side of the strip.

2. Method of producing a segment of a cage for the rolling elements of a bearing, comprising the steps of piercing by means of first punches and a die a row of spaced apertures in a strip of material thereby forming bars between the apertures, said row extending longitudinally of the strip and the bars extending transversely of the strip; the die having punch-receiving openings which have rounded edges extending transversely of said row, whereby the punches deform portions of the bars adjacent said rounded edges when piercing the apertures and produce on the flanks of the bars depending lips extending transversely of said row; placing the pierced strip on an anvil with said lips bearing on the anvil; pressing second punches between the bars against the anvil, the second punches having rounded edges extending transversely of said row, whereby the second punches substantially flatten the face of the strip adjoining the anvil and urge the lips inwardly of the apertures and thereby form inwardly extending nose portions on said flanks; and bending the strip so that it assumes substantially the shape of a portion of a cylinder having an axis parallel to the bars with the nose portions on the wardly of said cylinder, the width between adjacent flanks of bars defining the same aperture are made to taper inwardly o fsaid cylinder, the width between adjacent flanks defining the same aperture, measured between said nose portions, being less than the diameter of said rolling elements to such extent that when the rolling elements radially abut said nose portions the elements protrude from the outer convex face of the strip.

3. Method of producing a segment of a cage for the rolling elements of a bearing, comprising the steps of piercing by means of first punches and a die a row of spaced apertures in a strip of material thereby forming bars between the apertures, said row extending longitudinally of the strip and the bars extending transversely of the strip; the die having punch-receiving openings which have rounded edges extending transversely of said row, whereby the punches deform portions of the bars adjacent said rounded edges when piercing the apertures and produce on the flanks of the bars depending lips extending transversely of said row; placing the pierced strip on an anvil with said lips bearing on the anvil; pressing second punches between adjacent bars against the anvil, the second punches having rounded edges extending transversely of said row, whereby the second punches substantially flatten the face of the strip adjoining the anvil and urge the lips inwardly of the apertures and thereby form inwardly extending nose portions on said flanks; and bending the strip so that it assumes the shape of a portion of a cylinder having an axis parallel to the bars with the nose portions on the convex side of the strip, whereby the flanks of adjacent bars defining the apertures are made to taper inwardly of said cylinder, the width between adjacent flanks defining the same aperture measured between the nose portions being less than the diameter of said rolling elements whereby the latter are retained in the strip in the outer radial direction and the width between adjacent flanks defining the same aperture measured on the concave face of the strip, being less than the diameter of said rolling elements to such extent that when the rolling elements radially abut said nose portions the elements protrude from the outer convex face of the strip.

4. Method of producing a segment of a cage for the rolling elements of a bearing, comprising the steps of piercing by means of first punches and a die a row of spaced apertures in a strip of material thereby forming bars between the apertures, said row extending longitudinally of the strip and the bars extending transversely of the strip; the die having punch-receiving openings which have rounded edges extending transversely of said row, whereby the punches deform portions of the bars adjacent said rounded edges when piercing the apertures and produce on the flanks of the bars depending lips extending transversely of said row; placing the pierced strip on an anvil with said lips bearing on the anvil; pressing second punches between the bars against the anvil, the second punches having rounded edges extending transversely of said row, whereby the second punches substantially flatten the face of the bars adjoining the anvil and urge the lips inwardly of the apertures and thereby form inwardly extending nose portions on said flanks; and bending the strip so that it assumes the shape of a portion of a cylinder having an axis parallel to the bars, whereby the adjacent flanks of bars defining the same aperture are made to taper inwardly of said cylinder, the width between said nose portions of adjacent flanks defining the same aperture, being less than the diameter of said rolling elements to such extent that when the rolling elements radially abut said nose portions the elements protrude from the strip.

5. Method of producing a segment of a cage for the rolling elements of a bearing, comprising piercing a row of spaced apertures in a strip of material thereby forming bars between the apertures, said row extending longitudinally of the strip and the bars extending transversely of the strip, each aperture being partially pierced by first punches cooperating with punch-receiving openings in a first die, and partially pierced by a second punch which is intermediate the first punches and pierces in a direction opposed to the piercing direction of the first punches and cooperates with a punch-receiving opening in a second die, said punch-receiving openings having rounded edges extending transversely of said row, whereby the first punches and second punches deform portions of the bars adjacent said rounded edges when piercing the apertures and respectively produce on the flanks of the bars downwardly and upwardly projecting lips extending transversely of said row, placing the pierced strip against flat anvil means with the lips bearing against the anvil means, pressing third and fourth punches between the bars and against the anvil means so as to flatten both faces of the strip and urge the lips respectively produced by the first and second punches inwardly of the apertures and thereby form inwardly extending nose portions on said flanks, and bending the strip so that it assumes substantially the shape of a portion of a cylinder having an axis parallel to the bars, the width between adjacent flanks defining the same aperture, measured between the nose portions on the convex face of the strip, being less than the diameter of said rolling elements, and the width between adjacent flanks defining the same aperture, measured between the nose portions on the concave face of the strip, being less than the diameter of said rolling elements to such extent that when the rolling elements radially abut said nose portions the elements protrude from the outer convex face of the strip, the rolling elements also being retained by the nose portions on the convex face of the strip radially and outwardly of the strip.

References Cited by the Examiner

UNITED STATES PATENTS

| | | | |
|---|---|---|---|
| 1,928,823 | 10/1933 | Young | 308—217 |
| 2,288,564 | 6/1942 | Gales | 29—148.4 |
| 3,199,935 | 8/1965 | Pitner | 308—217 |

JOHN F. CAMPBELL, *Primary Examiner.*

THOMAS H. EAGER, *Examiner.*